United States Patent
Zhang et al.

(10) Patent No.: US 7,418,490 B1
(45) Date of Patent: Aug. 26, 2008

(54) SYSTEM USING MULTIPLE SETS OF DEVICE MANAGEMENT POLICIES FOR MANAGING NETWORK DEVICES CONNECTED ON DIFFERENT NETWORK INTERFACES

(75) Inventors: Peinan C. Zhang, San Jose, CA (US); Sonali Kochar, Union City, CA (US); Aniruddh S. Dikhit, Cupertino, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 1018 days.

(21) Appl. No.: 10/748,579

(22) Filed: Dec. 29, 2003

(51) Int. Cl.
*G06F 15/173* (2006.01)
(52) U.S. Cl. ...................... 709/223; 709/224
(58) Field of Classification Search ............... 709/223, 709/220, 251, 324, 228, 224; 714/47; 370/229
See application file for complete search history.

(56) References Cited

U.S. PATENT DOCUMENTS

| | | | |
|---|---|---|---|
| 6,847,609 B1 * | 1/2005 | Sarnikowski et al. | 370/229 |
| 7,206,846 B1 * | 4/2007 | Dini et al. | 709/228 |
| 2001/0013107 A1 * | 8/2001 | Lewis | 714/47 |
| 2002/0116544 A1 * | 8/2002 | Barnard et al. | 709/324 |
| 2003/0120822 A1 * | 6/2003 | Langrind et al. | 709/251 |
| 2004/0221038 A1 | 11/2004 | Clarke et al. | |

OTHER PUBLICATIONS

Sun Microsystems, Inc., "Sun™ Management Center 3.0 Software Installation Guide," Nov. 2000, Revision A, Part No. 806-5943-10, 60 pages.
Sun Microsystems, Inc., "Sun™ Management Center 3.0 Configuration and Deployment Guide," Apr. 2002, Part No. 816-5316-10, 81 pages.

* cited by examiner

*Primary Examiner*—Le Luu
(74) *Attorney, Agent, or Firm*—Hickman Palermo Truong & Becker LLP (57) ABSTRACT

A mechanism for managing network devices using a server with multiple network interfaces includes management agents executing on managed devices, wherein all the agents that share a single instance of a management server, or that are logically partitioned, are said to be in a single "server context". Each server context can manage devices from any of multiple network interfaces of a server machine, that are associated with a given server context. Managed devices that are registered to be managed as part of a given server context are managed based on policies associated with the server context. Managed devices that are registered to be managed through one network interface of a server context of the management server may be communicatively isolated from managed devices that are registered to be managed through another network interface of the same server context of the management server.

34 Claims, 3 Drawing Sheets

SYSTEM USING MULTIPLE SETS OF DEVICE MANAGEMENT POLICIES FOR MANAGING NETWORK DEVICES CONNECTED ON DIFFERENT NETWORK INTERFACES

BACKGROUND

Generally, system management software tools provide the capability of managing multiple network devices ("managed devices"). In some system management architectures, a user, such as a system administrator, accesses an agent executing on any of a number of respective managed devices through a central management server. Hence, the administrator manages the managed devices via the management server.

The management server provides not only a path through which an administrator can monitor and manage a given managed device, but may also provide related services, such as user and device authentication and authorization, including communication key exchanges. The management server typically communicates with an agent on behalf of a user working from a remote console. The agents that execute on managed devices perform management operations based on commands from the server and provide detailed information to the server about respective managed devices.

In a large enterprise environment, it is common for the management server and the managed devices to have multiple network interfaces. Each interface typically has a unique network address, such as an IP address, and therefore such machines are sometimes referred to as multi-IP machines. Furthermore, an environment configured in this manner is sometimes referred to as a multi-IP environment.

It is often desirable for the management server to manage all devices that are connected to the server, no matter through which server interface the devices are connected. In addition, it is often desirable for the management server to be configurable to selectively manage only a certain portion of all of the connected devices. For example, in an environment in which the management server is connected to a public network such as the Internet and to multiple private networks, the server is expected to only manage the devices connected to the private networks.

The term "server context" is used to describe a group of devices, or agents executing on the devices, that share a single instance of a management server, as defined by an event destination of the agents, which is associated with one of the given server's interfaces. Typically, an event destination is uniquely identified by the network address and port of event services running on a management server. With past approaches, a single network address and port is identified as the event destination. Thus, with past approaches to multi-IP system management environments, the management server only recognizes agents that are sending traps or event identifiers to the server's "primary" interface or address, as being within the server's server context. As such, the server can only manage the devices connected to and communicating through a network interface that is specified, published or broadcast as the server's primary interface, unless a communication bridge is present between the primary interface and other secondary interfaces to which devices may be connected.

However, if a communication bridge is built between the primary interface and a secondary interface, the respective subnets of devices that are connected to the server through the primary and secondary interfaces are not secured with respect to each other. For example, if the primary management interface on the server is connected to a private network and a secondary interface on the server is connected to a public network, and there is a communication bridge between the primary and secondary interfaces, the private network could perhaps be compromised via the public network if sufficient security mechanisms are not employed. Thus, the current approach to managing multiple subnets of devices through a central multi-IP management server leaves much to be desired.

SUMMARY

Embodiments of the present invention provide an improved mechanism for managing network devices using a server with multiple network interfaces. Management agents executing on managed devices, all sharing a single instance of a management server, are said to be in a single "server context". Each server context can comprise one or more "server ranges", with each server range being associated with one interface of the management server and one set of device monitoring and management policies and privileges. Devices said to be in a given server context can be managed from any of multiple network interfaces on the server machine that are configured to be associated with the given server context.

Generally, managed devices that are registered to be managed through a particular server range of the management server are managed based on one or more policies associated with the particular server range. Managed devices that are registered to be managed through a first server range associated with a server context are communicatively isolated from managed devices that are registered to be managed through a second server range associated with the same server context. Hence, separate subnets that are associated with and managed as part of the same server context via different network interfaces are isolated from each other and, therefore, secure from each other.

In an embodiment, a process for managing a network of devices comprises associating first and second sets of management policies with first and second server ranges and, therefore, with first and second network interfaces. Furthermore, a user can be associated with multiple server ranges. Hence, a user can have a particular set of privileges when using the first server range and a different particular set of privileges when using the second server range. For example, policies that include read only privileges are associated with a first server range or identifier of a system management server and policies that include read and write privileges are associated with a second server range or identifier of the management server, and user X is authorized to use both server ranges.

First and second network devices are registered with, for example, the management server. The registration of the first device includes identifying the first network interface as the only interface from which the first device is manageable, and the registration of the second device includes identifying the second network interface as the only interface from which the second device is manageable. Based on the respective registrations, the first and second network devices are managed based on the first and second sets of management policies, respectively.

BRIEF DESCRIPTION OF THE DRAWINGS

Embodiments of the present invention are illustrated by way of example, and not by way of limitation, in the figures of the accompanying drawings and in which like reference numerals refer to similar elements and in which.

DETAILED DESCRIPTION OF EMBODIMENTS

Operating Environment Example

Figure 1:
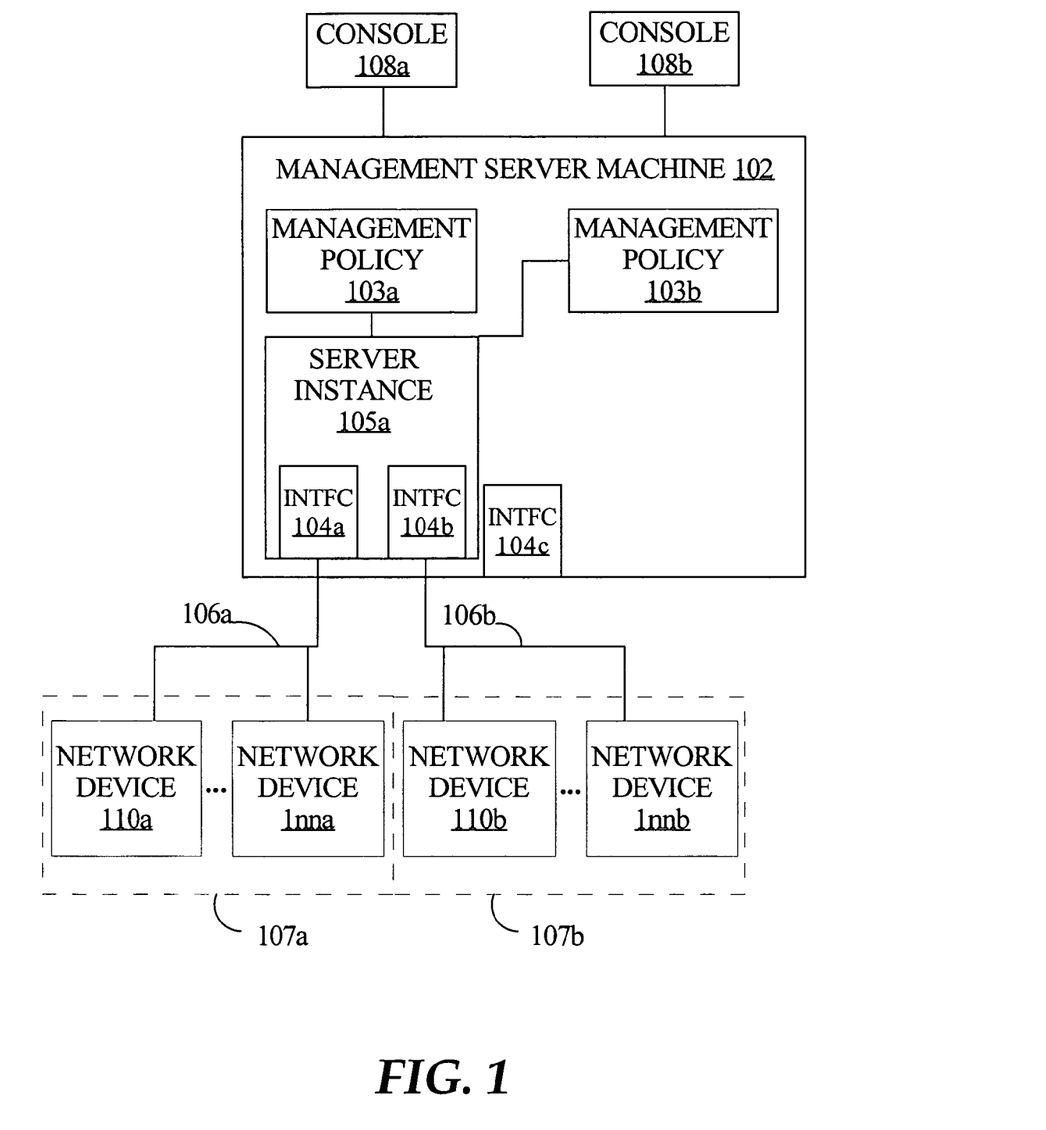
FIG. 1 is a block diagram that illustrates an example of an operating environment in which an embodiment of the invention can operate.

FIG. 1 is a block diagram that illustrates an example of an operating environment in which an embodiment of the invention can operate. Generally, the operating environment is configured according to a three-tier architecture having a console layer, a server layer and an agent layer.

One or more consoles 108a, 108b are communicatively coupled to one or more network devices 110a-1nna and 110b-1nnb, through a management server machine 102. Consoles 108a, 108b are any mechanism from which a user, such as a system administrator, can communicate with management server machine 102. For example, consoles 108a, 108b may be conventional computer systems, such as computer system 300 of FIG. 3. A user may communicate with management server machine 102 using, for example, a CLI (Command Line Interface) or a GUI (Graphical User Interface) displayed on respective displays of consoles 108a, 108b. Further, consoles 108a, 108b communicate with management server machine 102 and ultimately network devices 110a-1nna and 110b-1nnb using a suitable communication protocol, such as SNMP. Two consoles are shown for purposes of example only, for implementations may vary as to how many consoles are communicatively coupled to management server machine 102.

Figure 3:
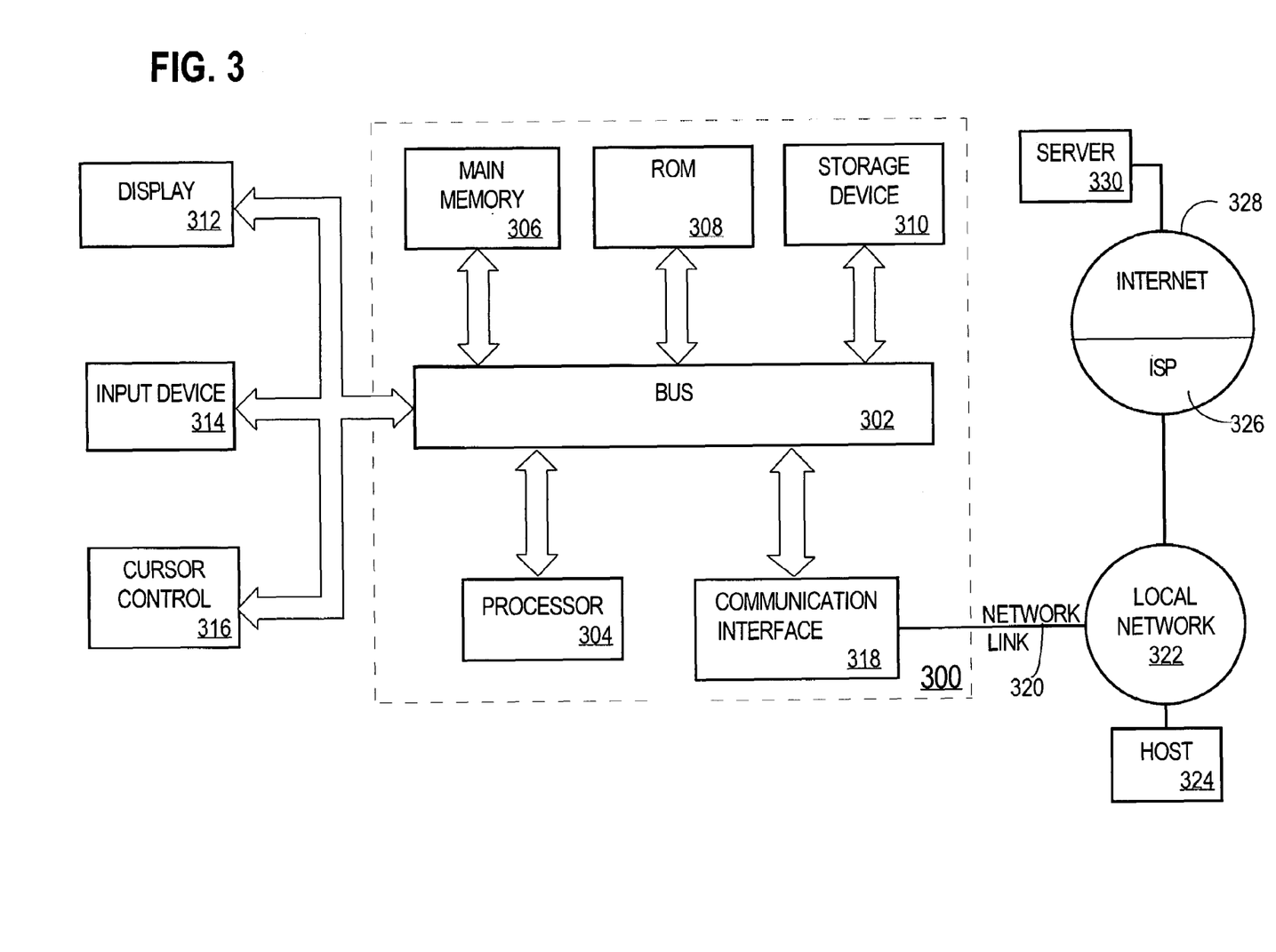
FIG. 3 shows a hardware block diagram of a computer system on which embodiments of the invention may be implemented.

Management server machine 102 may be any conventional computing platform, such as computer system 300 (FIG. 3). Management server machine 102 executes one or more management server instances, such as server instance 105a, which is an instance of a network device management application. Management server machine 102 provides the computing platform through which managed devices, such as network devices 110a-1nna, 110b-1nnb, are managed.

Associated with management server instance 105a is one or more management policies 103a, 103b. Management policies 103a, 103b specify and describe policies regarding devices that are managed based on such policies. For non-limiting examples, policies 103a, 103b may include, relative to the devices with which respective policies are associated, privileges or permissions regarding monitoring (e.g., read only permission) and managing (e.g., read/write permission) of information, such as MIBs (Management Information Bases), on respective network devices 110a-1nna and 110b-1nnb. In an embodiment, each management policy 103a, 103b is associated with a particular server range.

For example, a member of "general" user group may be granted read-only privileges; a member of an "operator" user group may be granted some write and other general privileges, such as acknowledging alarms, setting thresholds and modifying properties on managed objects; and a member of an "administrator" user group may be granted operator privileges as well as the right to grant and revoke access control privileges of other users or groups.

Thus, role-based access control can be implemented via management policies 103a, 103b, such that, in order to perform a particular operation, a user would have to be a member of a particular group and be authenticated as such. For example, users can be partitioned according to roles, roles or groups created for specific commands (e.g., printing, tape backup, system administration), and one or more roles associated with a given user on a given interface. For example, user A associated with a agent or device in server range 1 has operator privileges and user A associated with a agent or device in server range 2 has administrator privileges. Furthermore, a management policy can be constructed so that it applies to a user depending on the target device or agent with which the user is interacting.

In an embodiment in which multiple network interfaces, such as interfaces 104a and 104b, are not communicatively isolated from each other, network devices 110a, 110n can be logically partitioned. For example, although network device 110a is directly coupled to interface 104a and because network device 110a can reach interface 104b through a communication bridge between 110a and 110b, network device 110a can report to interface 104b in order to avail of privileges associated with a user and with interface 104b. Hence, logical partitioning can be used to define a server context, rather than strictly basing definition of a server context on physical subnets, where the subnets are not always isolated.

Management policies 103a, 103b may be further associated with authentication and authorization parameters and procedures relating to users at consoles 108a, 108b, with respect to their capabilities relating to accessing, monitoring or managing certain network devices, such as network devices 110a-1nna and 110b-1nnb. Furthermore, management policies 103a, 103b may be associated with authentication and authorization parameters and procedures relating to the network devices 110a-1nna and 110b-1nnb, with respect to registering with and availing of the capabilities of management server machine 102. In one embodiment, management policies 103a and 103b include different policies and in another embodiment, policies 103a and 103b include the same policies. Two management policies are shown for purposes of example only, for implementations may vary as to how many sets of management policies are used and maintained by management server machine 102.

Management server machine 102 executes one or more server instances 105a of a management server application, each of which includes a similar set of components. Non-limiting examples of components within a given server instance may include a session service, topology service, event handler, configuration server and metadata repository. Server instance 105a is associated with one server contexts. Each server context is associated with one or more server ranges 107a, 107b, which are sets of agents that are associated with respective devices, such as network devices 110a-1nna, 110b-1nnb, and which send event information to a event destination that is associated with the server context.

At any point in time, agents belonging to a given server context send event information to one of the multiple network interfaces ("intfc") 104a, 104b of management server machine 102 and, therefore, are managed through one of the multiple network interfaces. However, an agent belonging to a given server context may be managed through any of the multiple network interfaces associated with the given server context. For example, as part of a first session, an agent A that is executing on network device 110a, initializes (e.g., "boots up") and registers with a first server range associated with its server context, such as a server range associated with interface 104a. Subsequently, as part of a second session, agent A can be reconfigured and initialize and register with a second server range associated with its server context, such as a server range associated with interface 104b.

Furthermore, if any of network devices 110a-1nna, 110b-1nnb are configured with multiple network interfaces, such a device can be managed through any of its multiple network interfaces. Thus, a single agent executing on a given managed device is reachable through any of the managed device's network interfaces. Likewise, a multiple-interface management server can manage devices and agents through any of its interfaces, which are activated via a configuration process. Once an agent is configured by specifying the agent's event destination (i.e., server interface), the agent belongs to only a single server range and, therefore, can only be monitored and managed by the management policies that are associated with that server range/interface.

In one embodiment, each device that is managed by a given server instance 105a is managed according to the same management policy 103a, 103b regardless of through which interface it is managed, as long as the given server instance is only associated with one server range that is associated with the multiple interfaces. In another embodiment, each device that is managed through a given interface of a given server instance is managed according to the same management policy that is associated with a particular server range, while devices that are managed through a different interface of the same server instance are managed according to a different management policy that is associated with a different server range.

In an embodiment, server instance 105a is communicatively coupled to more than one network interface. As shown in FIG. 1, server instance 105a comprises interfaces ("intfc") 104a and 104b. Two interfaces are shown coupled to server instance 105a for purposes of example only, for implementations may vary as to how many interfaces to which a given server instance, and, therefore, a given server context, is coupled. When generally discussing the network interfaces 104a-104c herein, interfaces 104a-104c are collectively referred to as interface(s) 104. Any of the interfaces 104a, 104b may be communicatively coupled through a network to one or more managed network devices 110a-1nna, 110b-1nnb.

Interfaces 104 may be implemented as conventional network interfaces, such as a physical network address and port of a computer. Each interface 104a, 104b may be associated with a different management policy 103a, 103b; however, an operating environment is not limited as such. Generally, interfaces 104a, 104b operate as a communication pathway between a server instance and network devices. For example, interface 104a is illustrated as communicatively coupled between server instance 105a and a network 106a, to which network devices 110a-1nna are coupled. Similarly, interface 104b is illustrated as communicatively coupled between server instance 105a and a network 106b, to which network devices 110b-1nnb are coupled.

It is through respective interfaces 104 that network devices 110a-1nna, 110b-1nnb are managed, via a respective server instance 105a. As mentioned, each interface 104 may be coupled to different networks or subnets, or multiple interfaces may be coupled to a given network or subnet. The interfaces 104 that are associated with a given server instance are communicatively uncoupled. Hence, networks that are coupled to respective interfaces 104 that are associated with a given server instance are communicatively isolated from each other.

A configuration as described provides at least (1) enhanced performance and scalability due to an increased number of management interfaces and the ability to manage each network device through any of the interfaces; (2) flexibility regarding the association of different management policies 103a, 103b with different managed networks 106a, 106b and respective connected network devices 110a-1nna, 110b-1nnb; as well as (3) enhanced security due to the capability to communicatively isolate different networks 106a, 106b (e.g., a public and a private network) and associated connected network devices 110a-1nna, 110b-1nnb that are managed by a given server instance 105a.

In an embodiment, a management server machine 102 and its associated one or more server instances 105a can be configured to specify which interfaces 104 are associated with a server context and which are not. For example, interface 104c of management server machine 102 can be configured for a purpose other than management of network devices 110a-1nna, 110b-1nnb, such as for communicating with management server machine 102 for administration thereof.

Functional Description of Device Management Using Multi-Interface Server

Figure 2:
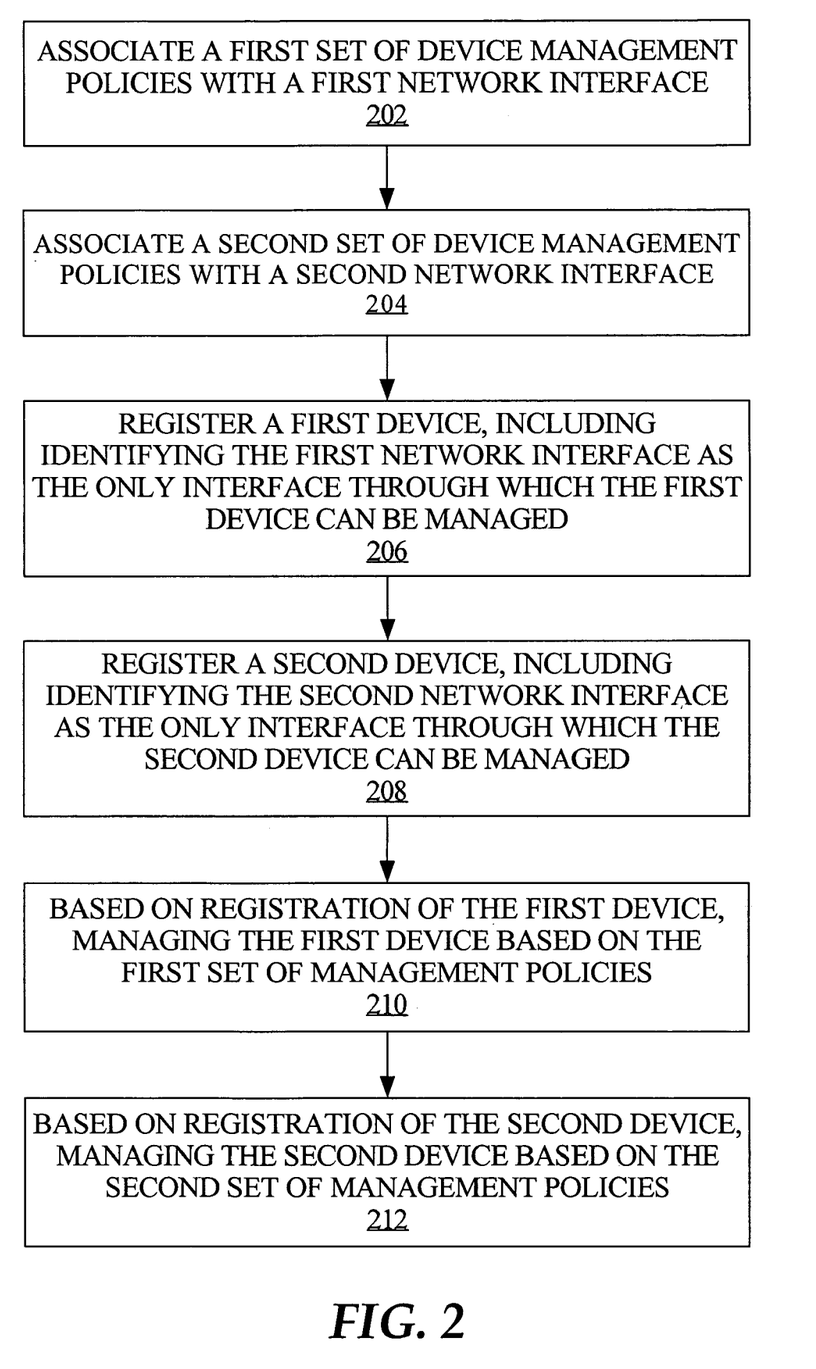
FIG. 2 is a flow diagram that illustrates a process for managing a network of devices, according to one embodiment of the invention.

FIG. 2 is a flow diagram that illustrates a process for managing a network of devices.

At block 202, a first set of device management policies is associated with a first network interface and at block 204, a second set of device management policies is associated with a second network interface. For example, management policy 103a is associated with a first server range that is associated with interface 104a of server instance 105a and management policy 103b is associated with a second server range that is associated with interface 104b of server instance 105a (FIG. 1). In one embodiment, the first management policy 103a and the second management policy 103b comprise the same policies and in another embodiment, the first management policy 103a and the second management policy 103b comprise different policies. Hence, managed devices that are managed through respective interfaces 104a and 104b of the same server instance 105 a may be managed according to the same or according to different management policies. For example, a user at console 108a may have permission to read from and write to (i.e., read-write privilege) network device 110a on network 106a via interface 104a associated with server instance 105a, but may have permission only to read from and not write to (i.e., read privilege) network device 110b on network 106b via interface 104b associated with server instance 105a (FIG. 1).

Furthermore, in one embodiment, the first and second network interfaces are communicatively isolated from each other. Consequently, managed devices on a first network are isolated from managed devices on a second network. For example, network devices 110a-110n on network 106a are isolated from and, therefore, unable to communicate through management server machine 102 with, network devices 110b-1nnb on network 106b (FIG. 1). For example, network 106a may be a private enterprise network, whereas network 106b may be a different network, such as the public Internet network. Such isolation may also be used to manage devices on only one of the networks 106a, 106b, such as only a private network.

At block 206, a first network device is registered, where registration of the first network device includes identifying the first network interface as an only interface from which the first network device is managed. Similarly, at block 208, a second network device is registered, where registration of the second network device includes identifying the second network interface as an only interface from which the second network device is managed. For example, when a management agent executing on network device 110a initializes, the agent reports to or registers with server instance 105a of management server machine 102 (FIG. 1). Further, when a management agent executing on network device 110b initializes, the agent reports to or registers with server instance 105a of management server machine 102. One suitable, but non-limiting, protocol that can be used for communications between management server machine 102 and network devices 110a-1nna, 110b-1nnb is SNMP.

Included in information transmitted to the server instance 105a as part of the registration process is the network address currently associated with the agent, such as a network address of network device 110a (FIG. 1), and the event destination that is associated with the agent. The event destination typically is the network address of the network interface 104a through which network device 110a is to communicate with the server instance 105a and, therefore, the interface through which the device is managed. The event destination is the destination to which the agent sends event information, such as an event packet, to the management server machine 102 (FIG. 1). For example, an event packet may be sent from the agent to the server upon initialization of the agent, or an associated device threshold being exceeded, or the like.

In an embodiment, based on the registration information, management server machine 102 (FIG. 1) validates the registering device, which includes validating that the server context associated with the registered event destination is associated with a valid server range and associated network interface through which the registering device is manageable. Once validation is completed, management server machine 102 distributes one or more security keys to the registering device, where each key is associated with a user that can communicate with the registering device through a console 108a, 108b. With respect to the management server machine 102, part of the validation process includes (1) requesting from a network device, or an agent executing on the network device, its event destination; and (2) checking the registered event destination against a list of server ranges and associated network interfaces, or network address associated therewith, that are configured on server 102 to serve as device management interfaces.

At some point, a user/administrator may communicate with management server machine 102 to communicate with, monitor or manage a managed network device 110a-1nna, 110b-1nnb (FIG. 1). Such a user logs in to management server machine 102, whereby a validation process is performed with respect to an associated server instance. Optionally, management server machine 102 validates the user session using conventional methods, such as using username and password authentication and authorization, with respect to the user's permission to communicate with a given managed device. Furthermore, management policies 103a, 103b (FIG. 1) may be used to determine what privileges a given user has with respect to the managed device that the user intends to manage, for example, general, operator or administrator privileges.

In addition, as part of the optional user session validation process, management server machine 102 (FIG. 1) determines whether the agent on the device with which the user wants to communicate is associated with a valid server context or not. If the agent that the user wants to communicate with is in a valid server context, then the user will be able to manage the agent with some level of privileges. Management server machine 102 may then return a response to the user that indicates whether the agent is in the proper server context or not.

Returning to FIG. 2, at block 210, based on the registration of the first network device at block 206, the first network device is managed based on the first set of management policies. Similarly at block 212, based on the registration of the second network device at block 208, the second network device is managed based on the second set of management policies. For example, network device 110a is managed by a user at console 108a, via server instance 105a of management server machine 102, according to policies specified in management policy 103a (FIG. 1); and network device 110b is managed by a user at console 108b, via server instance 105a of management server machine 102, according to policies specified in management policy 103b (FIG. 1).

Using the techniques described herein, a multi-IP server is able to manage connected network devices through multiple network interfaces. Each server interface may be associated with a different set of device management policies. Hence, devices on networks that are connected to the server via different server interfaces are manageable according to respective sets of policies that are associated with each server interface. Each server interface may be communicatively uncoupled to each other server interface. Hence, networks connected to different server interfaces are isolated from each other, even if being managed as a single server context. Furthermore, a multi-IP server is able to manage a multi-IP device through any of the device's multiple network interfaces.

Hardware Overview

In one embodiment, the server instance 105a and the agents running on network devices 110a-1nna, 110b-1nnb of the present invention are implemented as a set of instructions executable by one or more processors. The invention may be implemented as part of an object oriented programming (OOP) system, and in some embodiments is implemented in a non-OOP system. In one embodiment, the Java™ programming system is utilized, whereas in another embodiment, C/C++ languages may be utilized. Furthermore, different programming languages may be used for different components, such as Java™ for the console and management server and C and Tcl for the agents. Another programming framework which may be utilized to implement the described techniques includes the .NET framework.

FIG. 3 is a block diagram that illustrates a computer system 300 upon which an embodiment of the invention may be implemented. Computer system 300 includes a bus 302 or other communication mechanism for communicating information, and a processor 304 coupled with bus 302 for processing information. Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Computer system 300 further includes a read only memory (ROM) 308 or other static storage device coupled to bus 302 for storing static information and instructions for processor 304. A storage device 310, such as a magnetic disk, optical disk or magneto-optical disk is provided and coupled to bus 302 for storing information and instructions. It is contemplated that one or more components of the computer system 300 may be located remotely and accessed via a network.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

Embodiments of the invention are related to the use of computer system 300 for implementing the techniques described herein. According to one embodiment of the invention, those techniques are performed by computer system 300 in response to processor 304 executing one or more sequences of one or more instructions contained in main memory 306. Such instructions may be read into main memory 306 from another machine-readable medium, such as storage device 310. Execution of the sequences of instructions contained in main memory 306 causes processor 304 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 300, various machine-readable media are involved, for example, in providing instructions to processor 304 for execution. Such a medium may take many forms, including but not limited to, non-volatile media, volatile media, and transmission media. Non-volatile media includes, for example, optical, magnetic or magneto-optical disks, such as storage device 310. Volatile media includes dynamic memory, such as main memory 306. Transmission media includes coaxial cables, copper wire and fiber optics, including the wires that comprise bus 302. Transmission media can also take the form of acoustic or light waves, such as those generated during radio-wave and infrared data communications.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 304 for execution. For example, the instructions may initially be carried on a magnetic disk of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are exemplary forms of carrier waves transporting the information.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution. In this manner, computer system 300 may obtain application code in the form of a carrier wave.

EXTENSIONS AND ALTERNATIVES

Alternative embodiments of the invention are described throughout the foregoing description, and in locations that best facilitate understanding the context of the embodiments. Furthermore, the invention has been described with reference to specific embodiments thereof. It will, however, be evident that various modifications and changes may be made thereto without departing from the broader spirit and scope of the invention. For example, although a single server instance is depicted in FIG. 1, embodiments are applicable to operating environments in which a server machine executes multiple server instances. The specification and drawings are, accordingly, to be regarded in an illustrative rather than a restrictive sense.

In addition, certain process steps are set forth in a particular order, and alphabetic and alphanumeric labels may be used to identify certain steps. Unless specifically stated in the description, embodiments of the invention are not necessarily limited to any particular order of carrying out such steps. In particular, the labels are used merely for convenient identification of steps, and are not intended to specify or require a particular order of carrying out such steps.

What is claimed is:

1. A method for managing a network of devices, the method comprising:

associating a first set of device management policies with a first network interface;

associating a second set of device management policies with a second network interface, wherein the second network interface is different from the first network interface;

registering a first network device, wherein registration includes identifying the first network interface as an interface from which the first network device can be managed;

registering a second network device, wherein registration includes identifying the second network interface as an interface from which the second network device can be managed;

based on the registration of the first network device, managing the first network device based on the first set of management policies; and based on the registration of the second network device, managing the second network device based on the second set of management policies.

2. The method of claim 1, wherein the second network interface is communicatively isolated from the first network interface.

3. The method of claim 2, wherein the second network interface is logically isolated from the first network interface.

4. The method of claim 1, wherein the first network interface and the second network interface are both associated with the same instance of a management application.

5. The method of claim 1, wherein the first set of management policies is different from the second set of management policies.

6. The method of claim 5, wherein the first set of management policies includes a permission to write to the first network device and the second set of management policies includes a permission to read from but not write to the first network device.

7. The method of claim 1, wherein the first set of management policies is the second set of management policies.

8. The method of claim 1, wherein the first network device is configured on a first network and the second network device is configured on a second network, and wherein the first network is different from the second network.

9. The method of claim 8, wherein the first network is a public network and the second network is a private network, and wherein the first network interface is communicatively uncoupled to the second network interface.

10. The method of claim 1, wherein the first network device and the second network device are configured on a same network.

11. The method of claim 1, further comprising:
associating a third network interface with a set of policies that are not regarding management of devices, wherein registration of the first and second network devices cannot include identifying the third network interface as an interface from which the first or second network devices can be managed.

12. The method of claim 1, further comprising:
validating whether the first network device is manageable through the first network interface by comparing the registration identifying the first network interface as an interface from which the first network device can be managed with information that specifies all network interfaces from which the first network device can be managed.

13. The method of claim 1, wherein the registration of the first network device includes identifying the first network interface as an only interface from which the first network device can be managed, and wherein the registration of the second network device includes identifying the second network interface as an only interface from which the second network device can be managed.

14. A method for registering a managed device for management by a management application executing on a computer system having multiple network interfaces, the method comprising:
identifying a first network interface, of the computer system, that is associated with a first instance of the management application, as an interface from which a first managed device can be managed;

wherein a second managed device identifies a second network interface, of the computer system, that is different than the first network interface and that is associated with the first instance of the management application, as an interface from which the second managed device can be managed; and responding to management requests that are based on a first set of management policies that is associated with the first network interface.

15. The method of claim 14, wherein the second managed device responds to management requests that are based on a second set of management policies that is associated with the second network interface.

16. The method of claim 15, wherein the first set of management policies is different from the second set of management policies.

17. The method of claim 16, wherein the first set of management policies includes a permission to write to the first managed device and the second set of management policies includes a permission to read from but not write to the first managed device.

18. The method of claim 15, wherein the first set of management policies is the second set of management policies.

19. The method of claim 15, wherein the first managed device is configured on a first network and the second managed device is configured on a second network, and wherein the first network is different from the second network.

20. The method of claim 19, wherein the first network is a public network and the second network is a private network, and wherein the first network interface is communicatively uncoupled to the second network interface.

21. The method of claim 15, wherein the first network device and the second network device are configured on a same network.

22. In a computer system on which one or more applications execute, a computer-readable storage medium comprising instructions which, when executed by one or more processors, cause the one or more processors to manage a network of devices by:
associating a first set of device management policies with a first network interface;
associating a second set of device management policies with a second network interface, wherein the second network interface is different from the first network interface;
registering a first network device, wherein registration includes identifying the first network interface as an interface from which the first network device can be managed;
registering a second network device, wherein registration includes identifying the second network interface as an interface from which the second network device can be managed;
based on the registration of the first network device, managing the first network device based on the first set of management policies; and
based on the registration of the second network device, managing the second network device based on the second set of management policies.

23. The computer-readable storage medium of claim 22, wherein execution of the instructions by the one or more processors causes the one or more processors to further manage a network of devices by:
validating whether the first network device is manageable through the first network interface by comparing the registration identifying the first network interface as an interface from which the first network device can be managed with information that specifies all network interfaces from which the first network device can be managed.

24. In a computer system on which one or more applications execute, a computer-readable storage medium comprising instructions which, when executed by one or more processors, cause the one or more processors to register a managed device for management by a management application executing on a server computer having multiple network interfaces by:
   identifying a first network interface, of the server computer, that is associated with a first instance of the management application, as an interface from which a first managed device can be managed;
   wherein a second managed device identifies a second network interface, of the server computer, that is different than the first network interface and that is associated with the first instance of the management application, as an interface from which the second managed device can be managed; and
   responding to management requests that are based on a first set of management policies that is associated with the first network interface.

25. The computer-readable storage medium of claim 24, wherein the second managed device responds to management requests that are based on a second set of management policies that is associated with the second network interface.

26. The computer-readable storage medium of claim 25, wherein the first set of management policies is different from the second set of management policies.

27. The computer-readable storage medium of claim 25, wherein the first set of management policies is the second set of management policies.

28. The computer-readable storage medium of claim 24, wherein the first network device and the second network device are configured on a same network.

29. The computer-readable storage medium of claim 28, wherein the first network is a public network and the second network is a private network, and wherein the first network interface is communicatively uncoupled to the second network interface.

30. The computer-readable storage medium of claim 24, wherein the first managed device is configured on a first network and the second managed device is configured on a second network, and wherein the first network is different from the second network.

31. An apparatus on which one or more applications execute, the apparatus comprising:
   a network interface;
   a memory; and
   one or more processors connected to the network interface and the memory, the one or more processors configured for
      associating a first set of device management policies with a first network interface;
      associating a second set of device management policies with a second network interface, wherein the second network interface is different from the first network interface;
      registering a first network device, wherein registration includes identifying the first network interface as an interface from which the first network device can be managed;
      registering a second network device, wherein registration includes identifying the second network interface as an interface from which the second network device can be managed;
      based on the registration of the first network device, managing the first network device based on the first set of management policies; and
      based on the registration of the second network device, managing the second network device based on the second set of management policies.

32. An apparatus on which one or more applications execute, the apparatus comprising:
   a network interface;
   a memory; and
   one or more processors connected to the network interface and the memory, the one or more processors configured for
      identifying a first network interface, of a multi-interface computer, that is associated with a first instance of the management application, as an interface from which a first managed device can be managed;
      wherein a second managed device identifies a second network interface, of the multi-interface computer, that is different than the first network interface and that is associated with the first instance of the management application, as an interface from which the second managed device can be managed; and
      responding to management requests that are based on a first set of management policies that is associated with the first network interface.

33. A system for managing a network of devices, the system comprising:
   means for associating a first set of device management policies with a first network interface;
   means for associating a second set of device management policies with a second network interface, wherein the second network interface is different from the first network interface;
   means for registering a first network device, wherein registration includes identifying the first network interface as an interface from which the first network device can be managed;
   means for registering a second network device, wherein registration includes identifying the second network interface as an interface from which the second network device can be managed;
   means for managing the first network device based on the first set of management policies; and
   means for managing the second network device based on the second set of management policies.

34. A system that can register for management by a management application executing on a computer having multiple network interfaces, the system comprising:
   means for identifying a first network interface, of the computer, that is associated with a first instance of the management application, as an interface from which the system can be managed;
   wherein a second system identifies a second network interface, of the computer, that is different than the first network interface and that is associated with the first instance of the management application, as an interface from which the second managed device can be managed; and
   means for responding to management requests that are based on a first set of management policies that is associated with the first network interface.

* * * * *